(12) United States Patent
Cunningham (10) Patent No.: US 8,108,333 B2
(45) Date of Patent: Jan. 31, 2012

(54) SYSTEM AND METHOD FOR COMPUTING CUMULATIVE DENSITIES OF DATA REPRESENTED BY GAUSSIAN DISTRIBUTIONS

(75) Inventor: John Patrick Cunningham, Saratoga, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 670 days.

(21) Appl. No.: 12/266,977

(22) Filed: Nov. 7, 2008

(65) Prior Publication Data

US 2010/0121615 A1   May 13, 2010

(51) Int. Cl.
G06F 15/18 (2006.01)
G06F 17/00 (2006.01)
G06N 5/04 (2006.01)

(52) U.S. Cl. .............................................. 706/61
(58) Field of Classification Search .................. None
See application file for complete search history.

(56) References Cited

U.S. PATENT DOCUMENTS 7,747,551 B2 * 6/2010 Snyder .......................... 706/20
2004/0199482 A1 * 10/2004 Wilson .......................... 706/25

OTHER PUBLICATIONS

Clustering of Gaussian probability density functions using centroid neural network, Dong-Chul Park; Oh-Hyun Kwon; Minsoo Suk; Electronics Letters vol. 39, Issue: 4 Digital Object Identifier: 10.1049/el:20030247 Publication Year: 2003, pp. 381-382.*

Polynomial expansion of the probability density function about gaussian mixtures, Cavalcante, C.C.; Mota, J.C.M.; Romano, J.M.T.; Machine Learning for Signal Processing, 2004. Proceedings of the 2004 14th IEEE Signal Processing Society Workshop Digital Object Identifier: 10.1109/MLSP.2004.1422970 Publication Year: 2004, pp. 163-172.*

Learning probability density functions from marginal distributions with applications to Gaussian mixtures, Qutang Cai; Changshui Zhang; Chunyi Peng; Neural Networks, 2005. IJCNN '05. Proceedings. 2005 IEEE International Joint Conference on vol. 2 Digital Object Identifier: 10.1109/IJCNN.2005.1556015 Publication Year: 2005, pp. 1148-1153 vol. 2.*

Multiscale probability density function analysis: non-Gaussian and scale-Invariant fluctuations of healthy human heart rate Kiyono, K.; Struzik, Z.R.; Aoyagi, N.; Yamamoto, Y.; Biomedical Engineering, IEEE Transactions on vol. 53, Issue: 1 Digital Object Identifier: 10.1109/TBME.2005.859804 Publication Year: 2006, pp. 95-102.*

A. Genz et al. "Numerical Computation of Multivariate Normal Probabilities." J. Comp. Stat. 1: pp. 141-149 (1992).

T. Minka. "Expectation Propagation for Approximate Bayesian Inference." Proc. of the 17th Conf. in Uncertainty in Art. Intelligence, pp. 362-369 (2001).

(Continued)

*Primary Examiner* — Michael B Holmes
*Assistant Examiner* — Luis Sitiriche
(74) *Attorney, Agent, or Firm* — Crawford Maunu PLLC (57) ABSTRACT

Probability densities are calculated. According to an example embodiment, a Gaussian probability density is computed for a set of data representing a multivariate Gaussian distribution (Gaussian) by matching moments of truncated distributions. A distribution is projected onto dimensions of the set of data to generate cavity-local Gaussians. For the set of data, site-local univariate Gaussians are selected so that the moments match cavity-local univariate Gaussians (the moments of the product of the cavity-local Gaussians and the selected site-local univariate Gaussians, match the moments of the product of the cavity-local Gaussians and the cavity-local truncations). The selected site-local univariate Gaussians are aggregated globally to form a new global Gaussian.

20 Claims, 4 Drawing Sheets

OTHER PUBLICATIONS

H. Joe. "Approximations to Multivariate Normal Rectangle Probabilities based on Conditional Expectations." Journal of the American Statistical Society 90(431): pp. 957-964 (1995).

T. Minka. "Divergence measures and message passing." Microsoft Research Tech. Report MSR-TR-2005-173: pp. 1-17 (Dec. 2005).

W. C. Horrace. "Some results of the multivariate truncated normal distribution." J. Multivariate Analysis 94(1): pp. 209-221 (2005).

C.E. Rasmussen et al. Gaussian Processes for Machine Learning. Table of Contents and Section 3.6 entitled "Expectation Propagation": pp. 52-60. MIT Press, Cambridge, MA (2006).

R. Cranley et al. "Randomization of Number Theoretic Methods for Multiple Integration." SIAM J. Numer. Analys. 13(6): pp. 904-914 (Dec. 1976). Abstract only.

D. Nuyens et al. "Fast component-by-component construction of rank-1 lattice rules with a non-prime number of points." Journal of Complexity 22(1), pp. 4-28 (Feb. 2006). Abstract only.

J. Jawitz. "Moments of truncated continuous univariate distributions." Advances in Water Resources 27: pp. 269-281 (2004). Abstract only.

H. Niederreiter. "On a Number-Theoretical Integration Method." Aequationes Mathematicae 8(3): pp. 304-311 (Oct. 1972). Abstract and p. 304 only.

T. Minka. "A family of algorithms for approximate Bayesian inference." Ph.D. Thesis—Doctor of Philosophy in Comput. Science & Engineer., Massachusetts Institute of Technology, 75 pgs. (Jan. 2001).

H. Niederreiter. "Quasi-Monte Carlo Methods and Pseudo-Random Numbers." Bulletin of the American Math. Society 84(6): pp. 957-1041 (Nov. 1978).

\* cited by examiner

SYSTEM AND METHOD FOR COMPUTING CUMULATIVE DENSITIES OF DATA REPRESENTED BY GAUSSIAN DISTRIBUTIONS

FIELD

The present invention relates generally to computational processing, and more specifically, to systems and methods for computing cumulative densities of data that can be represented by Gaussian distributions.

BACKGROUND

The Gaussian probability distribution, also called the normal distribution or the bell curve, is an important probability distribution to science, engineering, and the natural world. Its ubiquity is due largely to the Central Limit Theorem, which proves the tendency of many random events such as thermal noise, repeated flips of a coin, or student examination scores (to name a few) to be well described by a Gaussian distribution (see, e.g., A. Papoulis and S. U. Pillai, Probability, Random Variables, and Stochastic Processes, McGraw Hill, Boston, 2002). Gaussian distributions (also referred to as "Gaussians") can be univariate (one random variable) or multivariate (a vector of jointly Gaussian random variables), and the probability density of a Gaussian at any point can be readily calculated as $$p(x) = \frac{1}{(2\pi)^{\frac{n}{2}}|\Sigma|^{\frac{1}{2}}} \exp\left\{-\frac{1}{2}(x-\mu)^T \Sigma^{-1}(x-\mu)\right\}, \quad (1)$$

where $x \in R^n$ is a vector with n real valued elements, $\mu \in R^n$ is the mean vector defining the center of the Gaussian, and $\Sigma \in R^{n \times n}$ is the symmetric, positive semidefinite covariance matrix describing the spread of the Gaussian (in the univariate case, $\Sigma = \sigma^2$, the familiar variance term).

In addition to the Central Limit Theorem, the Gaussian receives much attention because of its attractive mathematical properties—for example, unlike many probability distributions, adding and scaling Gaussians yields again a Gaussian. The moment generating function (and characteristic function) of a Gaussian is also a convenient closed-form expression. However, despite its beneficial aspects, the Gaussian presents difficulty in that its cumulative distribution function (cdf) has no closed-form expression and is difficult to calculate. The cdf calculates the probability that a random draw from a Gaussian falls below a certain value (e.g., the probability that a student scores less than a particular value on a test).

In connection with these, cumulative densities represent the probability that a random draw falls in a particular region $A \in R^n$. Generally, for a region of interest A in a distribution, where the height of the curve corresponds to the probability density p(x), the cumulative density is the total mass captured above that region A. Mathematically, this is represented as follows $$F(A) = Prob\{x \in A\} = \int_A p(x)dx = \int_{l_1}^{u_1} \ldots \int_{l_n}^{u_n} p(x)dx_n \ldots dx_1, \quad (2)$$

where $l_1, \ldots, l_n$ and $u_1, \ldots, u_n$ denote the upper and lower bounds of the region A. This cumulative density F(A) generalizes the cdf, as the cdf can be recovered by setting $l_1 = \ldots = l_n = -\infty$ (the region A is unbounded to the left). Cumulative densities are important, as is the distribution itself, and the applications are equally widespread, such as those relating to statistics, economics, mathematics, biostatistics, environmental science, computer science, neuroscience and machine learning.

A well-labored body of work has involved investigating methods for calculating these quantities relative to Gaussian cumulative densities. The univariate cdf can be very quickly and accurately calculated using a number of techniques (see, e.g., W. J. Cody, Rational chebyshev approximations for the error function, Math. Comp., pp. 631.638, 1969). These methods are so fast and accurate that the univariate cdf, often denoted $\emptyset(\bullet)$ or a scaled version of the complementary error function erfc($\bullet$), is available with machine-level precision (as precise as a digital computer can represent any number) in many statistical computing packages (e.g., normcdf in MATLAB, CDFNORM in SPSS, pnorm in R, to name a few).

However, calculating multivariate Gaussians continues to be challenging. Previous approaches for calculating multivariate cumulative densities have generally required sophisticated numerical integration techniques, which can be undesirable as relative to computational time and power. Importantly, these methods do not produce an analytical form to their answer, so derivatives and other optimizations with respect to cumulative densities cannot be performed. These and other issues remain as a challenge to a variety of methods, devices and systems that use or benefit from Gaussian-based processing.

SUMMARY

Various aspects of the present invention are directed to devices, methods and systems for generating and using Gaussian-based information in a manner that addresses challenges including those discussed above.

According to a first example embodiment, the present invention is directed to a computer-based method for computing cumulative probability densities of a set of data representing multivariate Gaussians. The method is implemented as follows: generating cavity-local univariate truncated Gaussians by truncating cavity-local univariate Gaussians for the set of data; creating a current global Gaussian based on site-local univariate Gaussians being such that the product of the site-locals with the cavity-locals has moments that match moments of the truncated cavity-local univariate Gaussians; and in response to the current global Gaussian matching a previous global Gaussian, generating Gaussian probability density data corresponding to the set of data.

According to another embodiment, cumulative densities of multivariate Gaussian distributions are calculated for a set of data having a corresponding global Gaussian distribution. Local one-dimensional distributions for the set of data and moments thereof are calculated by projecting a Gaussian distribution onto each dimension to produce cavity-local univariate Gaussians. The cavity-local univariate Gaussians are truncated to form cavity-local univariate truncated Gaussians, and site-local univariate Gaussians are chosen such that the product of the site-locals with the cavity-locals has moments that match moments of the truncated cavity-local univariate Gaussians. The site-local Gaussians are aggregated into a new global Gaussian, which is compared against a previous global Gaussian. If the new global Gaussian does not match the previous global Gaussian, the steps of generating, truncating, selecting, aggregating and comparing are repeated. If the comparison indicates that the new global Gaussian matches the previous global Gaussian, the method is determined to have converged, and the matching Gaussians are used to compute a Gaussian probability density for the set of data, as well as produce an analytical result that can be manipulated.

Another example embodiment is directed to a system for computing cumulative probability densities of a set of data representing multivariate Gaussian distributions and having a corresponding global Gaussian distribution. The system includes a data storage circuit to store algorithm data, and a software-programmed computer circuit to execute an algorithm in the stored algorithm data to perform the following steps. Local one-dimensional distributions are generated for the set of data and moments thereof are calculated by projecting a Gaussian distribution onto each dimension to produce cavity-local univariate Gaussians. The cavity-local univariate Gaussians are truncated to form cavity-local univariate truncated Gaussians, and site-local univariate Gaussians are chosen such that the product of the site-local univariate Gaussians with the cavity-local univariate Gaussians has moments that match moments of the truncated cavity-local univariate Gaussians. The site-local univariate Gaussians are aggregated into a new global Gaussian, and the new global Gaussian is compared against a previous global Gaussian. In response to the comparison indicating that the new global Gaussian does not match the previous global Gaussian, the steps of generating, truncating, selecting, aggregating and comparing are repeated. In response to the comparison indicating that the new global Gaussian matches the previous global Gaussian, the method is determined to have converged, and the matching Gaussians are used to compute a Gaussian probability density for the set of data.

Other embodiments are directed to a software-programmed computer to carry out the steps as described above, and to a computer-readable medium upon which code is stored and which, when executed by a computer, causes the computer to carry out the above steps.

The above summary is not intended to describe each embodiment or every implementation of the present disclosure. The figures and detailed description that follow more particularly exemplify various embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims.

DETAILED DESCRIPTION

The present invention relates to devices, methods and systems involving the generation and/or implementation of processing and calculation techniques as described herein. While the present invention is not necessarily limited to such approaches, various aspects of the invention may be appreciated through a discussion of examples using these and other contexts.

According to an example embodiment, the cumulative distribution function of multivariate Gaussian distributions is calculated using a fast and accurate approach involving the calculation of cumulative densities of low-dimensional or high-dimensional Gaussian probability distributions. In various implementations, this approach is effected using a computer programmed to execute an algorithm that uses relatively low computational overhead (i.e., resulting in a fast run-time) and an analytical expression that can be readily manipulated.

Various embodiments are directed to casting the cumulative density problem as a calculation of the zeroth moment of a truncated distribution. A distribution $q(\bullet)$ is projected onto each dimension, local moments are matched, and that information is aggregated globally to form a new $q(\bullet)$.

In connection with these and other embodiments, it has been discovered that the seemingly unrelated field of Bayesian inference can be implemented for use in a directed, principled, and computationally fast approach for calculating multivariate cumulative densities with high accuracy. Bayes' rule states that, for any random variables x and y (which may be vector-valued), one can relate their conditional probabilities with $$p(x|y) = \frac{p(y|x)p(x)}{p(y)}, \tag{3}$$

where $p(x|y)$ denotes the conditional probability of x, given y. In many problems, one knows the model $p(x)$ for some hidden data x, and one knows how some observed data y is generated from x (the model $p(y|x)$). Bayes' rule then allows inference of the hidden data x, given y (the probability $p(x|y)$, as calculated above). An intractable distribution $p(\bullet)$ ((e.g., $p(x|y)$ above) is approximated with a tractable, convenient distribution $q(\bullet)$, where $q(\bullet)$ is, by some definition, a desirable approximation of $p(\bullet)$. Such a desirable approximation, for example, can be implemented using a Gaussian distribution $q(\bullet)$ that matches its moments (zeroth—total mass, first—mean, and second—covariance) to the intractable $p(\bullet)$. Though the two distributions may not be the same at every point, their relative summary statistics are indeed the same.

In one general embodiment, the present invention is implemented in the form of a method by a software-programmed computer circuit. The computer circuit computes cumulative probability densities of a set of data representing multivariate Gaussians. The steps performed are as follows: generating cavity-local univariate truncated Gaussians by truncating cavity-local univariate Gaussians for the set of data; creating a current global Gaussian based on site-local univariate Gaussians chosen such that the product of the site-local univariate Gaussians with the cavity-local univariate Gaussians has moments that match the moments of the truncated cavity-local univariate Gaussians; and in response to the current global Gaussian matching a previous global Gaussian, generating Gaussian probability density data corresponding to the set of data.

In some embodiments of the present invention, an inference algorithm characterized as the Expectation Propagation (EP) algorithm is used to make a desirable approximation as described above. For general information regarding the EP algorithm, and for specific information regarding algorithm approaches that may be implemented with one or more example embodiments, reference may be made to T. P. Minka, *A family of algorithms for approximate Bayesian inference*, MIT Ph.D. Thesis, 2001; T. P. Minka, "Expectation Propagation for approximate Bayesian inference," *Uncertainty in AI*, pp. 362.369, 2001; and T. P. Minka, "Divergence measures and message passing," *Microsoft Research Tech. Report MSR-TR*-2005-173, 2005; all of which are fully incorporated herein by reference.

In various other embodiments, Gaussian cumulative densities are implemented with an inference algorithm by introducing a related distribution, the truncated multivariate normal $p_A(x)$. This distribution has the same shape as $p(x)$ on the region A as described in the background, but is zero elsewhere. Mathematically:

$$p_A(x) = \begin{cases} p(x) & x \in A \\ 0 & \text{otherwise} \end{cases} \quad (4)$$

Since $p_A(x)$ is a truncated distribution, it normalizes to $\int p_A(x)\,dx = \int_A p(x)\,dx$ (which is often called an unnormalized probability distribution, as it does not normalize to 1). This normalizer is the cumulative density of $p(x)$ over the region A (F(A) as described in the background), and this is the zeroth moment (total mass) of $p(x)$ on the region A. Accordingly, this distribution is applied to the EP moment-matching method described above. EP is generally used to produce a distribution $q(x)$ with different shape but identical moments and a tractable analytical form. In various implementations, a Gaussian is chosen for $q(x)$, but not truncated to A (consistent with embodiments discussed herein). In this context, the truncated distribution $p_A(x)$ is approximated with a different Gaussian $q(x)$ that, though not truncated, shares its zeroth (total mass), first (mean), and second (covariance) moments with $p_A(x)$. Since $q(x)$ has a tractable form, its moments are calculated (generally easily and exactly), and the calculation of this zeroth moment estimates the cumulative density F(A). For purposes of discussion herein, this approach to solving a moment-matching problem can be referred to as EP-based Gaussian Cumulative Density, or EPGCD in short. For general information regarding the truncated multivariate normal $p_A(x)$, and for specific information regarding algorithm approaches that may be implemented with one or more example embodiments, reference may be made to, W. C. Horrace, "Some results on the multivariate truncated normal distribution," *J Multivariate Analysis*, vol. 94, no. 1, pp. 209.221, 2005, which is fully incorporated herein by reference.

In connection with various embodiments, a method for approximating the cumulative density of multivariate Gaussian distributions involves the following steps. A Gaussian is projected onto single dimensions, and truncated moments of the projected Gaussian are matched to local Gaussians. These matched moments are aggregated to multiple dimensions. The process is monitored to detect convergence, with the previous steps iterated until such detection, resulting in the EPGCD calculation of cumulative density. The total mass of the untruncated EPGCD Gaussian thus calculates or otherwise provides F(A) with high accuracy.

Figure 1:
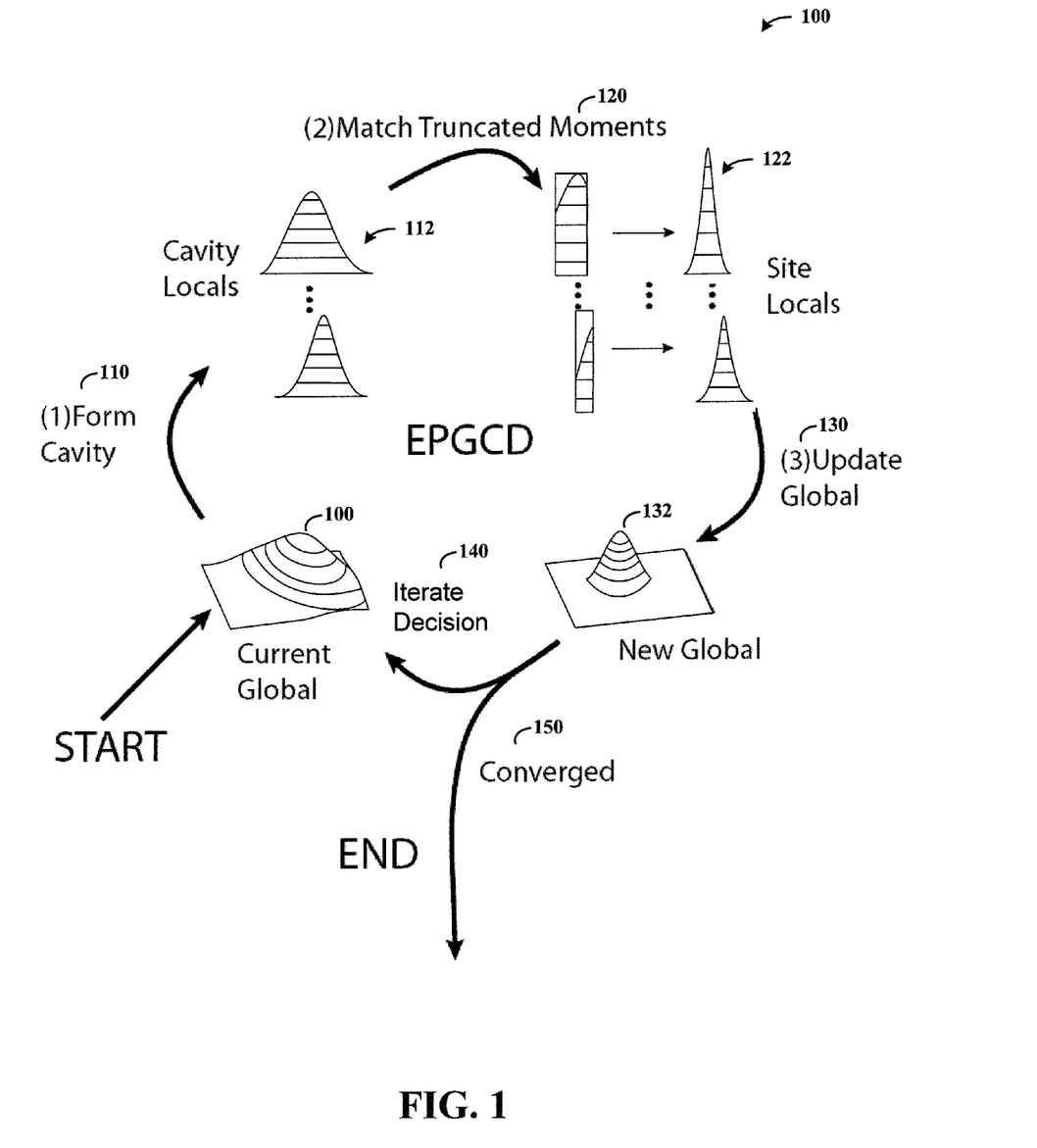
FIG. 1 shows a method for calculating the cumulative density of multivariate Gaussian distributions, according to an example embodiment of the present invention.

Turning now to the figures, FIG. 1 shows a method for calculating the cumulative density of multivariate Gaussian distributions (i.e., EPGCD), according to another example embodiment of the present invention. Generally, cumulative densities are calculated by iteratively projecting locally, matching moments locally, and aggregating that information globally, resulting in a desired F(A). To this end, a current global distribution 100 is retrieved or otherwise obtained to start of the process. At 110, local one-dimensional distributions (whose moments can be calculated) are formed, producing univariate Gaussians 112, referred to as cavity locals. At 120, the cavity locals are truncated using a soft truncation involving a univariate Gaussian such that the product of these produces moments that match the moments of a respective hard truncation, and this soft truncation is the site-local univariate Gaussian. The univariate truncated moments are exact, using the error function erf(•) as described, for example, in J. W. Jawitz, "Moments of truncated continuous univariate distributions," *Advances in Water Resources*, vol. 27, pp. 269.281, 2004, which is fully incorporated herein by reference. The site locals are updated and aggregated at 130 to form a new global distribution 132 (a new global $q(x)$) using standard properties of the Gaussian. Though the cavity and site distributions are local, this step couples all the local updates and makes the new $q(x)$ a global estimate of the high-dimensional moments of $p_A(x)$.

At 140, the new global distribution 132 is checked against a previous global distribution, and if the two do not match, the algorithm iterates at 110 as described above. If the new and previous global distributions match, convergence of the algorithm to a global $q(x)$ with the same moments and total mass as $p_A(x)$ is detected and corresponding data is output at 150. The resulting global Gaussian $q(x)$ has the same total mass as the truncated $p_A(x)$, and corresponds to the calculation of F(A) as this total mass is the cumulative density F(A). Moreover, as $q(x)$ is a regular Gaussian, its mass can be calculated exactly and with relatively straightforward computations.

Figure 2:
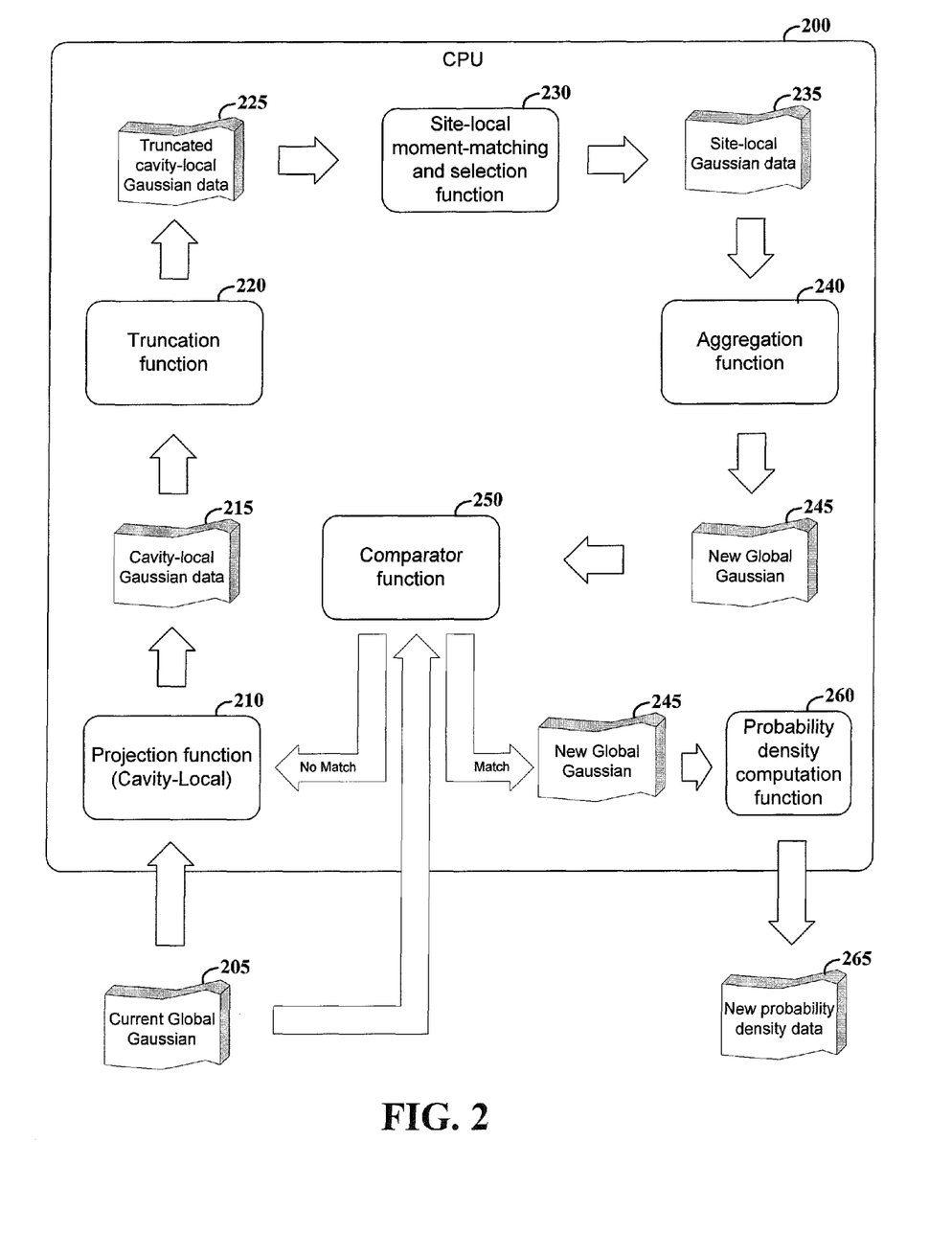
FIG. 2 shows a system for calculating the cumulative density of multivariate Gaussian distributions, according to another example embodiment of the present invention.

FIG. 2 shows a system 200 for calculating the cumulative density of multivariate Gaussian distributions, according to another example embodiment of the present invention. The system is CPU-based, with a computer-type circuit and/or system executing a plurality of functions (e.g., algorithms) to process data. These processing approaches may generally involve using one or more of the computational approaches described above or otherwise in this document or cited references, and including those embodiments described in the following discussion involving verification, divergence and other aspects.

Global Gaussian data 205 is received (or otherwise generated) and used at a projection function 210, which projects the data onto dimensions to produce one-dimensional cavity-local (univariate) Gaussian data 215. A truncation function 220 processes the cavity-local Gaussian data 215 to generate truncated cavity-local Gaussian data 225. A site-local moment matching and Gaussian selection function 230 selects univariate site-local Gaussians such that the moments of the product of the site-local with the cavity-local match the moments of the truncation of the cavity locals, to generate site-local Gaussian data 235. This approach generally involves the selection of site-local scaled univariate Gaussians as described herein.

An aggregation function 240 aggregates the site-local Gaussian data 235 to generate a new global Gaussian 245. A comparator function 250 compares the new global Gaussian to the current global Gaussian 205. If the new and current global Gaussians do not match, the CPU 200 iterates the process, beginning again at the projection function 210. If the new global Gaussian matches the current global Gaussian, a probability density computational function 260 computes and outputs new probability density data 265 from the new global Gaussian 245.

The above-discussed approaches to calculating the cumulative density of multivariate Gaussian distributions (i.e., EPGCD) can be implemented in a variety of manners. The following discussion details one of these manners, referring to the term "EPGCD" as generally applicable to the above (e.g., FIG. 1, FIG. 2 and other discussion). Generally, aspects of the Expectation Propagation (EP) are used in the above approaches for calculating cumulative densities, and in various embodiments, to replace an intractable $p(\cdot)$ with a tractable $q(\cdot)$ that approximates $p(\cdot)$ well. A natural measure for the quality of the approximation is Kullback-Leibler (KL) divergence, choosing $q(\cdot)$ to be a high-dimensional Gaussian, and the choice of $q(\cdot)$ that minimizes $KL(p\|q)$ (i.e., a desirable/best approximation) is the $q(\cdot)$ with the same zeroth (total mass), first (mean), and second (covariance) moments as $p(\cdot)$. To calculate a cumulative density $F(A)$, the zeroth moment of $p_A(x)$ is sought as discussed above (e.g., with Eq. 14 below). As such, reducing or minimizing this global KL divergence is carried out to calculate a cumulative density. An example proof for minimizing KL divergence results in moment matching (for this problem) is described later in this document, with aspects directed to iteratively minimizing the KL divergence of local, single dimensions of $q(\cdot)$ with respect to $p(\cdot)$.

In the discussion herein, various notations standard to EP are used to describe an EPGCD algorithm as referenced above (see, e.g., C. E. Rasmussen and C. K. I. Williams, *Gaussian Processes for Machine Learning*, MIT Press, Cambridge, 2006). The notation $N(\mu, \Sigma)$ denotes a Gaussian (that normalizes to 1) with mean $\mu$ and covariance $\Sigma$ (in any dimension n, thus $N(\mu, \sigma^2)$ denotes a univariate Gaussian). First, the region A is defined as a hyperrectangle bounded at each dimension i by lower and upper bounds $l_i$ and $u_i$. The cumulative density is sought for this region A of the high-dimensional Gaussian $p(x)=N(m, K)$. The term m is defined as $m=0$ with no loss of generality, as the region A can be shifted by m if $m \neq 0$ (having $m=0$ simplifies the presentation). Sites are defined as $t_i(x_i)=\delta(x_i \in [l_i, u_i])$, such that a function on the ith dimension that is 1 inside the interval $[l_i, u_i]$, and 0 otherwise. Then, by this definition, the definition of the cumulative density (Eq. 2) is rewritten as:

$$F(A) = \int_A p(x)dx = \int p_A(x)dx = \int p(x) \prod_{i=1}^{n} t_i(x_i) dx, \quad (5)$$

and $p_A(x)=p(x)\prod_{i=1}^{n}t_i(\chi_i)$. These (hard) truncations $t_i(\chi_i)$, referred to as the sites, make this integral intractable and are replaced with soft truncations $\tilde{t}_j(\chi_i)$, referred to as site approximations. The truncations $\tilde{t}_j(\chi_i)$ are chosen as scaled univariate Gaussians: $\tilde{t}_i(\chi_i)=\tilde{Z}_iN(\tilde{\mu}_i, \tilde{\sigma}_i^{-2})$ (note these $\tilde{t}_i(\chi_i)$ normalize to $\tilde{Z}_i$). The global approximation is thus $q(x)=p(x)\prod_{i=1}^{n}\tilde{t}_i(\chi_i) \approx p_A(x)$. Because $q(x)$ is a Gaussian (the product of Gaussians is another scaled Gaussian), its zeroth, first, and second moments are readily found. The parameters of these soft truncations $\tilde{t}_i(\chi_i)$ are chosen to minimize KL divergence.

Using a Gaussian approximation $q(x)=N(\mu, \Sigma)$ (i.e., derived via EP), site approximations $\tilde{t}_i(\chi_i)$ are refined. The approximation $q(x)$ is projected onto the ith dimension to consider what $\tilde{t}_i(\chi_i)$ should be included to minimize KL divergence in that dimension. To do this, the cavity local distribution is formed for the ith dimension (e.g., as at 110 in FIG. 1):

$$q_{-i}(x_i) = \int p(x) \prod_{j \neq i} \tilde{t}_j(x_j) dx = N(\mu_{-i}, \sigma_{-i}^2), \quad (6)$$

where $$\mu_{-i} = \sigma_{-i}^2(\sigma_i^{-2}\mu_i - \tilde{\sigma}_i^{-2}\tilde{\mu}_i), \text{ and } \sigma_{-i}^2 = (\sigma_i^{-2} - \tilde{\sigma}_i^{-2})^{-1},$$

This univariate Gaussian is the projection of all of $q(x)$ except for the ith site approximation (soft truncation) $\tilde{t}_i(\chi_i)$, which is desirably updated. Including this site approximation, the full projection of $q(x)$ onto the ith dimension is $q_{-i}(\chi_i)\tilde{t}_i(\chi_i)$. To match the global moments of $q(x)$ to those of $p_A(x)$, the moments of the projection are correspondingly matched. Considering the true site (the hard truncation) $t_i(\chi_i)$, which would result in the projection of the ith dimension $q_{-i}(\chi_i)t_i(\chi_i)$, the univariate KL divergence is minimized (e.g., reduced), resulting in matching the moments of $q_{-i}(\chi_i)t_i(\chi_i)$ to $q_{-i}(\chi_i)\tilde{t}_i(\chi_i)$. The product $q_{-i}(\chi_i)t_i(\chi_i)$ is a univariate truncated Gaussian (see, e.g., 122 in FIG. 1), and the moments of this product can be calculated exactly using the error function $erf(\cdot)$:

$$q_{-i}(x_i)t_i(x_i) \approx \hat{q}(x_i) = \hat{Z}_i N(\hat{\mu}_i, \hat{\sigma}_i^2), \quad (7)$$

where $$\hat{Z}_i = \frac{1}{2}(\text{erf}(\alpha) - \text{erf}(\beta)),$$

$$\hat{\mu}_i = \mu_{-i} + \frac{1}{\hat{Z}_i}\left(\frac{\sigma_{-i}}{\sqrt{2\pi}}(\exp\{-\alpha^2\} - \exp\{-\beta^2\})\right), \text{ and}$$

$$\hat{\sigma}_i^2 =$$

$$\mu_{-i}^2 + \sigma_{-i}^2 + \frac{\sigma_{-i}}{\sqrt{2\pi}}((l_i + \mu_{-i})\exp\{-\alpha^2\} - (u_i + \mu_{-i})\exp\{-\beta^2\}) - \hat{\mu}_i^2,$$

where the shorthand $$\alpha = \frac{l_i - \mu_{-i}}{\sqrt{2}\,\sigma_{-i}} \text{ and } \beta = \frac{u_i - \mu_{-i}}{\sqrt{2}\,\sigma_{-i}}$$

is used above. These moments will match the moments of $q_{-i}(\chi_i)\tilde{t}_i(\chi_i)$ (KL minimization) if $\tilde{t}_i(\chi_i)$ is chosen as:

$$\tilde{t}_i(x_i) = \tilde{Z}_i N(\tilde{\mu}_i, \tilde{\sigma}_i^2), \quad (8)$$

where $\tilde{\mu}_i = \tilde{\sigma}_i^2(\hat{\sigma}_i^{-2}\hat{\mu}_i - \sigma_{-i}^{-2}\mu_{-i}), \tilde{\sigma}_i^2 = (\hat{\sigma}_i^{-2} - \sigma_{-i}^{-2})^{-1},$ $$\tilde{Z}_i = \hat{Z}_i \sqrt{2\pi}\sqrt{\sigma_{-i}^2 + \tilde{\sigma}_i^2}\exp\left\{\frac{1}{2}(\mu_{-i} - \tilde{\mu}_i)^2/(\sigma_{-i}^2 + \tilde{\sigma}_i^2)\right\}.$$

This local site update (and the local updates from all other dimensions $j \neq i$) is then aggregated globally (see, e.g., 130 in FIG. 1) to form a new global Gaussian approximation as $q(x)=p(x)\prod_{i=1}^{n}\tilde{t}_i(\chi_i)$, which has an updated form:

$$q(x) = ZN(\mu, \Sigma), \quad (9)$$

$$\text{where } \mu = \Sigma\tilde{\Sigma}^{-1}\tilde{\mu}, \Sigma = (K^{-1} + \tilde{\Sigma}^{-1})^{-1},$$

$$\text{and } \log Z = -\frac{1}{2}\log|K + \tilde{\Sigma}| - \frac{1}{2}\tilde{\mu}(K + \tilde{\Sigma})^{-1}\tilde{\mu} + \sum_{i=1}^{n}\log \tilde{Z}_i - \frac{n}{2}\log(2\pi)$$

where $\tilde{\mu}$ denotes the vector of site means $\tilde{\mu}_i$, and $\tilde{\Sigma}$ denotes the diagonal matrix with diagonal elements of the site variances $\tilde{\sigma}_i^2$. These equations follow from standard normalization when considering a product of Gaussian distributions. The term Z is the zeroth moment of q(x), which is the EPGCD result for the cumulative density F(A). Of note, the form of Z can be readily differentiated as described, for example, in *Gaussian Processes for Machine Learning*, cited above.

This approach yields an updated $q(x)=ZN(\mu, \Sigma)$ that has minimized the KL divergence of the ith dimension and has updated the global q(x) to (desirably) reduce $KL(p_A(x)\|q(x))$. This update procedure can be iterated (e.g., at 140 in FIG. 1) until the algorithm converges (e.g., when the parameters of q(x) about stop changing). The global q(x) can be updated after every site update, or after a full sweep of all n sites. These approaches can be used to achieve convergence in fewer than 10 steps through all n sites, even for high n, to a common result regardless of the choice of when to update the global q(x). In some implementations, site updates (e.g., as in FIG. 1) are carried out in parallel, and this information is aggregated globally.

In various embodiments, the following algorithm is executed by a computer to generate a Gaussian as described herein, with references to the above equations:

---
Algorithm 1 EPGCD: Calculate F(A), the cumulative
density of p(x) on the region A.
---

1: Initialize with any q(x) defined by Z, μ, Σ.
2: while q(x) has not converged do
3:     for i ← 1 : n do
4:        form cavity local $q_{-i}(x_i)$ by Eq. 6.
5:        calculate moments of $q_{-i}(x_i)t_i(x_i)$ by Eq. 7.
6:        choose $\hat{t}_i(x_i)$ so $q_{-i}(x_i)\hat{t}_i(x_i)$ matches above moments by Eq. 8.
7:     end for
8:     update global Z, μ, Σ with new site approximations $\hat{t}_i(x_i)$ using Eq. 9.
9: end while
10: return Z, the total mass of q(x).

---

In some applications, the EP steps are reparameterized to ensure numerical stability, for example, by considering $$\frac{1}{\sigma_{-i}^2}$$

instead of $\sigma_{-i}^2$ (see, e.g., C. E. Rasmussen and C. K. I. Williams, *Gaussian Processes for Machine Learning*, MIT Press, Cambridge, 2006).

In various embodiments, the mean and covariance of the truncated distribution are also produced in connection with the above approaches, and are used, for example, in connection with one or more applications in various fields such as those benefitting from analysis and processing in connection with Bayesian inference as discussed above. Such fields may involve the calculation of cumulative densities for one or more of a variety of purposes, such as for determining probabilities based upon conditional expectations, recursive partitioning, determining pricing options, modeling left-censored repeated measures, comparing numerical algorithms, Bayesian entropy spatiotemporal mapping, estimation of neural models, and incomplete data classification. Other fields involve one or more of those described in the references cited herein.

Various embodiments are also directed to implementing the analytical results generated herein to readily differentiate the cumulative density result F(A) with respect to the Gaussian and region parameters. For example, if F(A) is a probability of classification error that is desirably minimized (e.g., reduced), the position of the Gaussian can be optimized (e.g., desirably set) with respect to that error (and any other constraints). Other embodiments are directed to estimating Gaussians in a manner that involves variations on the above approaches, such as by generalizing the region A to non-hyperrectangular regions.

The approaches/algorithms described herein for generating a new global Gaussian approximation, such as shown in and described in connection with FIG. 1, can be confirmed in one or more of a variety of manners, with the following discussion exemplifying the demonstration or confirmation of such results. Though a multitude of possible Gaussians may be applicable (e.g., choices of n, μ, and Σ) and are a corresponding multitude of possible cumulative density regions A, the algorithm can be applied to many different distributions across many different regions and many different dimensions. To evaluate the (EPGCD) results, a (brute force) Monte-Carlo (MC) sampling approach is used to calculate an accurate cumulative density estimate (e.g., over 99% accurate, such as described below). Densities are also calculated using the aforementioned numerical integration method, as a "Genz" method (and, for example, also as described below). Agreement between the three values generated using the Monte-Carlo, Genz, and above-discussed EPGCD approach (e.g., FIG. 1) is used to demonstrate that the cumulative densities are accurately calculated, or at least approximated with high accuracy. Example data for comparisons and validations are discussed later in this document. In some applications, a condition number of the covariance matrix is used to correlate positively (in some dimensions n) with an error between the above convergence approaches and related approaches such as the Genz and Monte Carlo approaches. Generally, the angular offset of the principle covariance axes (i.e., the extent to which the covariance is not axis-aligned), the volume of the region A, and the eccentricity of the region A, can be processed or otherwise used to characterize differences or expected errors as having relatively low effect.

Table 1 as follows shows example data for comparing and validating results using the approaches described herein, as well as average run-times and errors for each respective method.

TABLE 1

| Gaussian Dimension | Avg. Run Times | | | Avg. Pairwise % Errors | | | Speedup[3] EPGCD vs. Genz |
|---|---|---|---|---|---|---|---|
| | Numer. Integr. | | | MC vs. Genz | MC vs. EPGCD | EPGCD vs. Genz | |
| | MC[1] | Genz[2] | EPGCD | | | | |
| n = 2 | 1 min | 0.01 s | 0.001 s | 0.05% | 0.10% | 0.05% | 7× |
| n = 3 | 1 min | 0.02 s | 0.002 s | 0.08% | 0.12% | 0.05% | 10× |
| n = 4 | 1 min | 0.02 s | 0.002 s | 0.09% | 0.21% | 0.13% | 12× |
| n = 5 | 1 min | 0.03 s | 0.002 s | 0.21% | 0.31% | 0.11% | 13× |
| n = 10 | 2 min | 0.07 s | 0.003 s | 0.27% | 0.43% | 0.25% | 22× |
| n = 20 | 4 min | 0.15 s | 0.003 s | 0.34% | 0.41% | 0.14% | 44× |
| n = 50 | 11 min | 0.41 s | 0.012 s | 0.27% | 0.29% | 0.05% | 34× |
| n = 100 | 23 min | 1.71 s | 0.116 s | 2.30% | 1.22% | 0.02% | 15× |
| n = 500 | 4 hrs | 24.6 s | 4.915 s | 0.53% | 0.52% | 0.00% | 5× |
| n = 1000 | 8 hrs | 120 s | 34.75 s | 1.06% | 1.03% | 0.00% | 3× |

Each row of Table 1 corresponds to normal distributions of increasing dimension (number of jointly Gaussian random variables). At a given dimension n, 100 different regions A means μ, and covariance matrices Σ (10 for n=500 and n=1000) are chosen. The first group of columns shows runtimes for the numerical methods (MC (Monte-Carlo) and Genz) and EPGCD. The second group of columns indicates the average pairwise error (in %) between each pair of methods (MC and Genz, MC and EPGCD, and EPGCD and Genz). Because the true F(A) is unknown, and because both the MC and the Genz methods should calculate the correct answer, all methods are compared to each other. The last column indicates the speed-up of EPGCD vs. Genz. Speed-up comparisons to MC are not shown as MC is generally several orders of magnitude slower in run-time.

The exemplary embodiments in Table 1 show, across a diverse set of Gaussians and cumulative density regions, that all three methods calculate F(A) with desirable accuracy. The MC and Genz methods are over 99.9% similar for n=2; 3; 4, and then over 99% similar thereafter (excepting n=100 and 1000). EPGCD compares to MC similarly, matching the MC results slightly worse than matching of the Genz results for n up to 50, and slightly better than Genz thereafter. The example MC sampling estimates have standard deviation less than 0.01%, yet the error is not tightly bounded, thus misses may be expected. Considering the third error column, EPGCD vs. Genz, these two methods produce cumulative densities over 99% in agreement, and very often over 99.9% agreement, suggesting that these two methods, which approach the cumulative density problem from very different perspectives, are likely producing the correct or a highly accurate approximation of F(A).

In connection with embodiments related to Table 1, the following may be implemented in choosing random regions, means, and covariances. For any dimension n, a random, n-dimensional Gaussian (defined by its mean m and covariance K) and a random cumulative density region A can be chosen as follows and, where appropriate, repeated. First, a positive-valued n-vector is drawn from an exponential with mean 10 (λ=0.1, n independent draws from this distribution), which is referred to herein as the corresponding diagonal matrix (with this vector on the diagonal), the matrix of eigenvalues S. An n×n orthogonal matrix U is randomly drawn (orthogonalizing any random matrix with the singular value decomposition suffices), and the Gaussian covariance matrix $K=USU^T$ is formed. This procedure produces a spread of differing covariances K (with quite different eigenvalue spectra and condition numbers, as determined by the exponential draws of the eigenvalues in S). The mean is set for the Gaussian m=0 without loss of generality (note that, were m≠0, the region A can be selected to be shifted by m, and then the problem would be unchanged; instead, m can be left as zero (m=0), and the randomness of A can be implemented as sufficient).

With the Gaussian p(x)=N(m, K), the region A is defined for the cumulative density F(A). The hyperrectangle A can be defined by two n-vectors: the upper and lower bounds u and l. To make these vectors, a point is randomly drawn from the Gaussian p(x) and defined as an interior point of A. Randomly chosen lengths are added and subtracted to each dimension of this point, with the larger and smaller points referred to as the bounds $u_i$ and $l_i$, respectively. These random lengths are chosen uniformly with range proportional to the dimension of the data, to produce cumulative densities on the range of $10^{-8}$ to 1 (otherwise, as the dimension n grows, all cumulative densities for a fixed region length will get smaller and smaller, and comparing these methods at F(A)=0 can be less desirable).

With u, l, m, and K defined, a randomly chosen A and the Gaussian p(x) are defined, and the three cumulative density methods can be tested as previously described. This procedure produces a variety of Gaussians and regions, and results may suggest that any valid Gaussian will produce similar results.

In connection with various embodiments, verification can be carried out using a brute-force approach based on Monte Carlo sampling, as follows. Since the Gaussian p(x) is a simple analytical form, there are many available methods to draw random samples $x^{(m)}$ from the distribution p(x). By the law of large numbers, $$F(A) = Prob\{x \in A\} = \int_A p(x)dx = \lim_{M \to \infty} \frac{1}{M}\sum_{m=1}^{M} \delta(x^{(m)} \in A), \quad (10)$$

where $\delta(x^{(m)} \in A)$ equals 1 if the sample $x^{(m)}$ is in the region A, and 0 otherwise. By this construction, the sum in Eq. 10 is a binomial random variable with parameters M and F(A) (1). Accordingly, the variance of this estimate of F(A) is $$\frac{F(A)(1-F(A))}{M}.$$

This estimator should predict F(A) with a standard deviation less than $$\frac{100}{\sqrt{M}}\%.$$

Thus, drawing a relatively large number of samples M, converged to the correct cumulative density F(A) is achieved (e.g., using $M=10^8$ samples implies over 99.9% accuracy).

In connection with various embodiments, verification can be carried out using a Genz method as follows. A series of transformations of the region A and the Gaussian p(x) are made to facilitate accurate integration of this transformed region, and includes three transformations to F(A). The Gaussian integrand p(x) is whitened using a Cholesky factorization of $\Sigma$, which changes the integration bounds, and the integrand is removed altogether by transforming the integration bounds with a function using the cdf and inverse cdf of a univariate Gaussian. A further transformation is then carried out using points uniformly drawn from a [0, 1] interval, to set the integration region to the unit box (in $R^n$). Once this is done, choices are made on dimension ordering to improve accuracy. With all orderings and transformations completed, numerical integration is carried out over the unit hypercube, using either quasi-random integration rules or lattice-point rules. These approaches can be carried out using software such as MATLAB, such as by running a vectorized, lattice-point version of a Genz algorithm (e.g., using 5000 lattice points). In connection with these and related embodiments, reference may be made to the following Genz and related approaches such as for integration, each of which is fully incorporated herein by reference: A. Genz, "Numerical computation of multivariate normal probabilities," *J. Comp. Graph. Stat.*, vol. 1, pp. 141.149, 1992; H. Niederreiter, "On a number-theoretical integration method," *Aequationes Mathematicae*, vol. 8, pp. 304.311, 1972; R. Cranley and T. N. L. Patterson, "Randomization of number theoretic methods for multiple integration," *SIAM J. Numer. Anal.*, vol. 13, pp. 904.914, 1976; and D. Nuyens and R. Cools, "Fast component-by-component construction, a reprise for different kernels," in *Monte Carlo and quasi-Monte Carlo methods*, H. Niederreiter and D. Talay, Eds., pp. 371-385, Springer-Verlag, 2004.

The following discussion includes examples for proving KL divergence as may be implemented in connection with various example embodiments of the present invention, with the proof corresponding to matching the zeroth, first, and second moments of q(x) to $p_A(x)$. AS $p_A$ and q(x) do not normalize to 1, the general definition of KL divergence is used for non-negative distributions f(x) and g(x):

$$KL(f(x)\|g(x)) = \int f(x)\log\frac{f(x)}{g(x)}dx + \int g(x)dx - \int f(x)dx, \quad (11)$$

(e.g., as in H. Zhu and R. Rohwer, "Information geometric measurements of generalisation," *Aston Univ. Tech. Report NCRG*/4350, 1995; and in "Divergence measures and message passing," cited above and both fully incorporated by reference). Normalized KL divergence can be recovered when both f(x) and g(x) normalize to 1. The distribution q(x) that minimizes $KL(p_A(x)\|q(x))$, where $p_A(x)$ is defined in Eq. 14, can be achieved. Both p(x) and q(x) are rewritten in their Exponential Family representation, which reparametizes Eq. 1, using instead the sufficient statistics vector ø(x), which for the Gaussians in this problem is a vector of all elements $x_i$ and all pairs of elements $x_i x_j$. The mean and covariance parameters m, K of p(x) are reparameterized and become the so-called natural parameter vector $\theta_p$. This change is a convenient reparameterization, and no change to the distributions or to the moment-matching problem has taken place. In this form, p(x) (which does normalize to 1) and the distribution of interest, q(x) are redefined as:

$$p(x)=\exp\{\theta_p^T\phi(x)-\Phi(\theta_p)\}, \quad (12)$$

$$q(x)=Z\exp\{\theta_q^T\phi(x)-\Phi(\theta_q)\}, \quad (13)$$

where $\Phi(\theta)=\log\int\exp\{\theta^T\phi(x)\}dx$ normalizes q(x) to Z. Since both p(x) and q(x) are Gaussian, both distributions share the same sufficient statistics $\cup(x)$ and normalizing function $\Phi(\theta)$. For convenience, the definition of $p_A(x)$ is repeated here:

$$p_A(x) = \begin{cases} p(x) & x \in A \\ 0 & \text{otherwise.} \end{cases} \quad (14)$$

Thus, neither $p_A(x)$ nor q(x) normalize to 1. Since the distribution q(x) that minimizes $KL(p_A(x)\|q(x))$, is sought Z, $\theta_q$ is found, minimizing $$KL(p_A(x)\|q(x)) = \int p_A(x)\log\frac{p_A(x)}{q(x)}dx + \int q(x)dx - \int p_A(x)dx \quad (15)$$

$$= \int_A p(x)\log\frac{p(x)}{q(x)}dx + \int q(x)dx - \int_A p(x)dx \quad (16)$$

$$= \int_A p(x)\{(\theta_p - \theta_q)^T\phi(x)\}dx - \quad (17)$$

$$\int_A p(x)\{\Phi(\theta_p) - \Phi(\theta_q)\}dx -$$

$$\log Z\int_A p(x)dx + Z - \int_A p(x)dx,$$

where all equations follow from standard properties of the logarithm and the definitions of p(x) and q(x) in Eq. 12 and Eq. 13 (using the fact that Z does not depend on x to pull it out of the integrals). To minimize this KL, the derivative is taken with respect to the normalizer of q(x), namely Z:

$$\frac{d}{dZ}KL(p_A(x)\|q(x)) = -\frac{1}{Z}\int_A p(x)dx + 1 \quad (18)$$

$$= 0 \quad (19)$$

$$\Rightarrow Z^* = \int_A p(x)dx. \quad (20)$$

From this, minimizing the KL divergence over the normalizing constant Z matches the zeroth moments. Since the EP algorithm aims to minimize global KL over the higher order moments as well, KL is differentiated with respect to the natural parameters q(x), namely $\theta_q$:

$$\frac{d}{d\theta_q}KL(p_A(x)\|q(x)) = -\int_A p(x)\phi(x)dx + \int_A p(x)\nabla_{\theta_q}\Phi(\theta_q)dx. \quad (21)$$

$$= -\int_A p(x)\phi(x)dx + Z^*\nabla_{\theta_q}\Phi(\theta_q), \quad (22)$$

using $Z^*$ from Eq. 20 and the fact that $\Phi(\theta_q)$ does not depend on x. By the definition of $\Phi(\bullet)$ (after Eq. 13 above), $$Z^* \nabla_{\theta_q} \Phi(\theta_q) = Z^* \frac{\int \phi(x) \exp\{\theta_q^T \phi(x)\} dx}{\int \exp\{\theta_q^T \phi(x)\} dx} \quad (23)$$

$$= Z^* \int \phi(x) \exp\{\theta_q^T \phi(x) - \Phi(\theta_q)\} dx \quad (24)$$

$$= \int q(x) \phi(x) dx. \quad (25)$$

where q(x) is set to normalize to Z*. Finally, returning to Eq. 22 (and substituting in the result from Eq. 25), $$\frac{d}{d\theta_q} KL(p_A(x) \| q(x)) = -\int_A p(x)\phi(x)dx + \int q(x)\phi(x)dx \quad (26)$$

$$= -\int p_A(x)\phi(x)dx + \int q(x)\phi(x)dx \quad (27)$$

$$= -E_{p_A}(\phi(x)) + E_q(\phi(x)) \quad (28)$$

$$\Rightarrow E_{q^*}(\phi(x)) = E_{p_A}(\phi(x)), \quad (29)$$

where E(•) is used to represent expectation with respect to the distributions $p_A(x)$ and q(x). Further, since $\Phi(x)$ captures first and second order statistics (elements $x_i$ and $x_i x_j$, as above), Eq($\Phi(x)$) is the first and second moments of q(x) (so too for $p_A(x)$). Thus, in accordance with Eq. 20 and Eq. 29, to uniquely minimize the global KL divergence between the truncated distribution $p_A(x)$ and the Gaussian q(x), two steps are carried out. First, Z is set to be the total mass (zeroth moment) of $p_A(x)$, and second, $\theta_{q'}$ is set, with the natural parameters of q(x), such that the mean (first moment) and covariance (second moment) of q(x) equal exactly the first and second moments of $p_A(x)$. As it pertains to calculating cumulative densities, minimizing global KL divergence calculates the zeroth moment of $p_A$, which is exactly F(A), the cumulative density of interest.

As discussed above, the various embodiments described herein are applicable for use in computing the probabilities of some data or a range of data quickly and accurately, for many different applications, in many different industries as well as many research applications. Generally, the embodiments described herein can be used to operate upon data that can be well described by a Gaussian distribution (or normal distribution, or bell-curve), which are abundant in industry, science, and the natural world. Furthermore, many such applications involve manipulating these densities based on other constraints, using an analytical form for the cumulative density as described herein.

One particular field in which one or more example embodiments may be applied involves financial data-based computing and related functions, devices and systems. For instance, the probability density for a set of data can be generated for algorithm-based financial products and services, which may involve one or more of calculating projections, historical trends, and other aspects as quickly and as accurately as possible. For these approaches, analytical forms as described herein are particularly useful for calculating the effects of changes in relevant models. In this context, a variety of embodiments are directed to software-programmed computers that execute algorithms in accordance with the discussion herein, for industries such as quantitative and process-driven trading firms, hedge funds, and arbitragers.

Other fields to which one or more example embodiments may be applied involve those of statistics, biostatistics and health sciences. For instance, the above-discussed approaches may be implemented in calculating probabilities for a variety of different types of companies that develop and use statistical applications, and software developers that offer programs that perform statistical analysis when executed by a computer accordingly programmed. Other embodiments are directed to data analytics in health sciences applications, as useful by biostatistics/health care companies in analyzing data.

Other embodiments are directed to computing probability densities in communications fields, and in particular to manipulating or otherwise processing noise data modeled as Gaussian for a communications system. For instance, using one or more of the above approaches, a variety of operations such as calculating cumulative densities can be carried out on communicated data in a very fast and accurate manner. Many embodiments are directed to executing adaptive algorithms, as many communications systems employ, in connection with using an analytical form of cumulative density as described herein. Such embodiments may involve, for example, processing communications data for mobile and other types of communications devices, involving both front-end device and back-end hardware applications. Still other embodiments involve calculating densities as described herein as a function within network infrastructure devices for identifying and mitigating noise.

Figure 3:
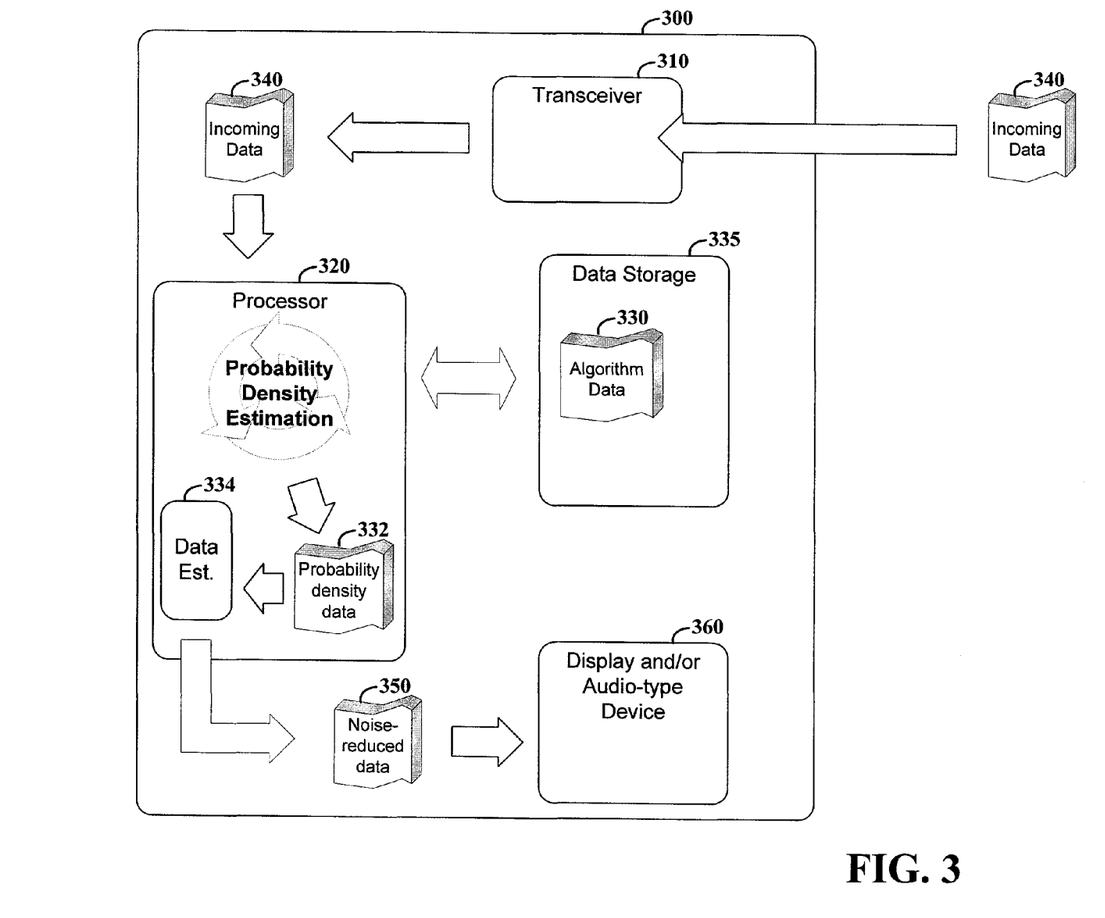
FIG. 3 shows a hand-held wireless device that processes noise data by calculating densities therefrom, according to another example embodiment of the present invention.

Another embodiment is exemplified in FIG. 3, which shows a hand-held wireless device 300 that processes noise data by calculating densities therefrom. The device 300 includes a transceiver 310 for transmitting and receiving wireless data, and a noise-based processing circuit 320 to process incoming data for mitigating noise. The processing circuit 320 (e.g., as a software-programmed processor) accesses stored algorithm data 330 from a data storage circuit 335 in accordance with one or more of the above approaches and relevant equations, and uses the algorithm data to process and reduce noise in the received data. For instance, where a set of wireless data 340 is received via the transceiver 310, the processing circuit 320 retrieves the stored algorithm data and uses that data to determine a probability density for the received data 340, and in turn uses that density to produce noise-reduced data 350. A display and/or audio-type device 360 receives and uses the noise-reduced data 350 to produce an output for a user of the hand-held device 300.

Figure 4:
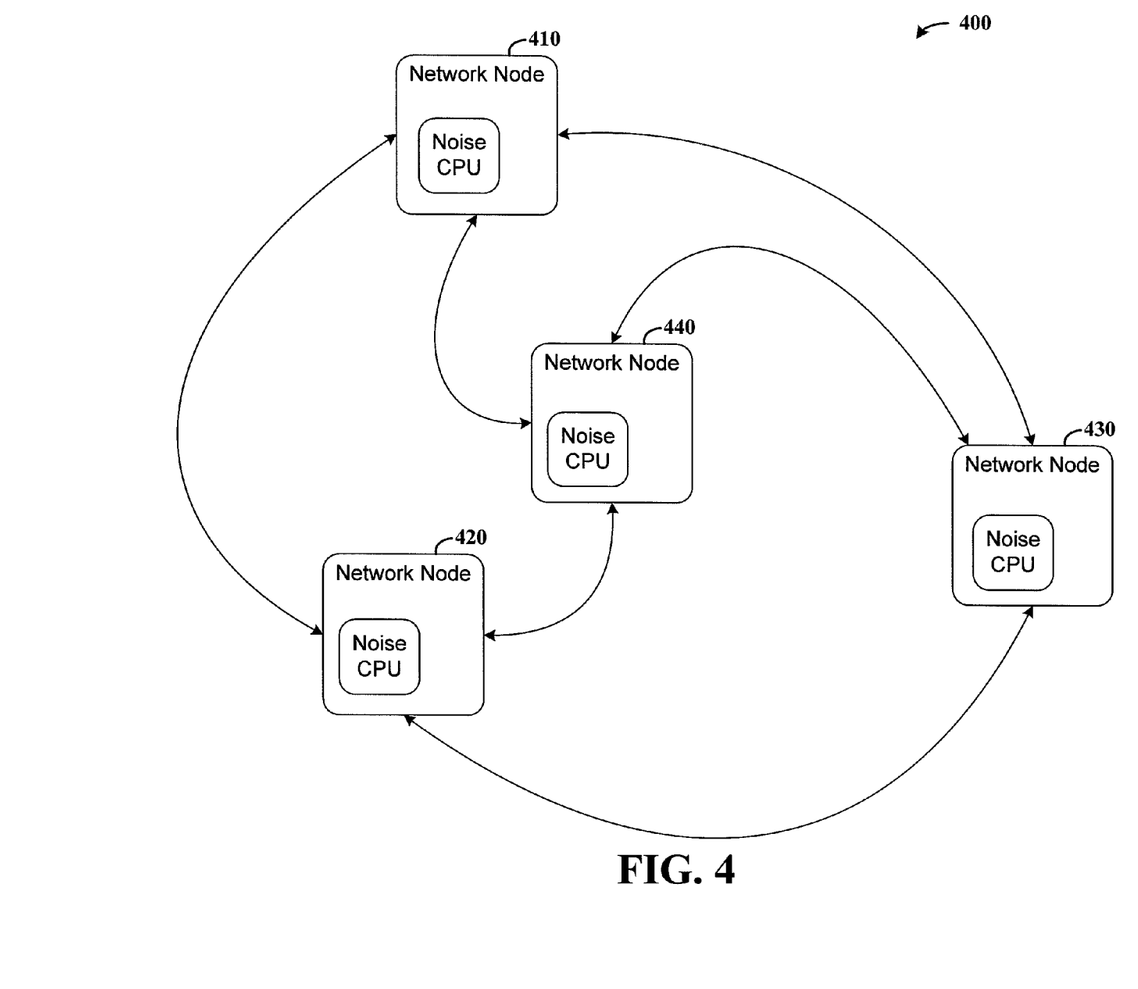
FIG. 4 shows a communications system 400 that processes noise data by calculating densities therefrom, according to another example embodiment of the present invention.

FIG. 4 shows a communications system 400 that processes noise data by calculating densities therefrom, according to another example embodiment of the present invention. The system 400 includes a network of communications nodes including nodes 410, 420, 430 and 440 that respectively communicate data such as packet-based data between one another. Each node is programmed with software to estimate noise in data using the equations as described above, to calculate probability densities for noise in communicated data (e.g., with noise-reduction CPUs implemented similar to processor 320 in FIG. 3).

In various applications, each node 410-440 includes a receiver circuit operating on a network for effecting communications between different users. For instance, where the system 400 is a wireless communications system within a home or business (e.g., a local area network), each node can be implemented as a wireless receiver that either directly mitigates noise or does so in connection with a computer processor at the node. Where the system 400 is a larger network (e.g., wide-area network), each node may mitigate noise in (wired or wireless) data communicated between nodes, and in turn pass data to additional computers connected to each node, which respectively act as distribution nodes.

Various embodiments described above, in connection with the figures, with the example verifications, proofs, algorithms and otherwise, may be implemented together. For example, the example algorithms, pseudocode and other description may be implemented in connection with one or more of the figures. One or more of the elements depicted in the drawings/figures can also be implemented in a more separated or integrated manner, or removed and/or rendered as inoperable in certain cases, as is useful in accordance with a particular application. It is also within the spirit and scope to implement a program or code that can be stored in a machine-readable medium to permit a computer to perform one or more aspects of the approaches described above. In view of the description herein, those skilled in the art will recognize that many changes may be made thereto without departing from the spirit and scope of the present invention.

What is claimed is:

1. For implementation by a programmed computer-based circuit, a method for computing probability densities of a set of data representing multivariate Gaussians, the method comprising the steps of:
    generating cavity-local univariate truncated Gaussians by truncating cavity-local univariate Gaussians for the set of data;
    selecting site-local univariate Gaussians based on a determination that the moments of the products of the cavity-local univariate Gaussians and the selected site-local univariate Gaussians match the moments of the cavity-local univariate truncated Gaussians; and
    in response to a current global Gaussian based on the site-local univariate Gaussians matching a previous global Gaussian, generating Gaussian probability density data corresponding to the set of data.

2. The method of claim 1, further including repeating both the steps of generating to provide a current global Gaussian that matches a previous global Gaussian.

3. The method of claim 2, further including
    calculating the products of the cavity-local univariate Gaussians and the cavity-local univariate truncated Gaussians that define a density region in the data;
    calculating moments of the products;
    selecting site-local univariate Gaussians based on a determination that the moments of the products of the cavity-local univariate Gaussians and the selected site-local univariate Gaussians match the moments of the cavity-local univariate truncated Gaussians.

4. The method of claim 3, wherein the step of selecting site-local univariate Gaussians includes selecting a scaled univariate Gaussian having parameters that minimize Kullback-Leibler (KL) divergence.

5. The method of claim 1, further including determining that the current global Gaussian matches the previous global Gaussian in response to the current global Gaussian having the same moments as the moments of a truncated multivariate normal distribution.

6. The method of claim 1, further including determining that the current global Gaussian matches the previous global Gaussian in response to the current global Gaussian having the same total mass as the total mass of a truncated multivariate normal distribution.

7. The method of claim 1, wherein the step of generating cavity-local univariate truncated Gaussians by truncating cavity-local univariate Gaussians for the set of data includes
    selecting density regions in the set of data to correspond to a characteristic of the data to be analyzed, and
    forming cavity-local univariate truncated Gaussians that define the selected density regions in the set of data.

8. The method of claim 1, wherein the step of generating cavity-local univariate truncated Gaussians by truncating cavity-local univariate Gaussians for the set of data includes
    selecting density regions in the set of data to correspond to a classification error that is desirably reduced, and
    forming cavity-local univariate truncated Gaussians that define the selected density regions in the set of data.

9. A method for computing a probability density of data representing a high-dimensional multivariate Gaussian, the method comprising the steps of:
    generating cavity-local Gaussians for each dimension of the high-dimensional Gaussian;
    calculating the products of the cavity-local Gaussians and a cavity-local truncation that defines a density region in the data;
    calculating moments of the products;
    selecting site-local univariate Gaussians so that the moments of the products of the cavity-local Gaussians and the site-local univariate Gaussians match the moments of the product of the cavity-local Gaussians and the local truncations; and
    aggregating the site-local univariate Gaussian into a new global Gaussian (e.g., by Eq. 9);
    comparing the new global Gaussian against a previous global Gaussian;
    in response to the comparison indicating that the new global Gaussian does not match the previous global Gaussian, repeating the steps of generating, calculating the products, calculating moments, selecting, aggregating and comparing; and
    in response to the comparison indicating that the new global Gaussian matches the previous global Gaussian, using the matching Gaussians to compute a Gaussian probability density.

10. A system for computing probability densities of a set of data representing multivariate Gaussians and having a corresponding global Gaussian, the system comprising:
    a data storage circuit to store algorithm data; and
    a software-programmed computer circuit to execute an algorithm in the stored algorithm data to perform the steps of
        generating local one-dimensional distributions for the set of data and calculating moments thereof by projecting a Gaussian onto each dimension to produce cavity-local univariate Gaussians,
        truncating the cavity-local univariate Gaussians to form cavity-local univariate truncated Gaussians,
        selecting site-local univariate Gaussians based on a determination that the moments of the products of the cavity-local univariate Gaussians and the selected site-local univariate Gaussians match the moments of the cavity-local univariate truncated Gaussians
        aggregating the site-local univariate Gaussians into a new global Gaussian,
        comparing the new global Gaussian against a previous global Gaussian,
        in response to the comparison indicating that the new global Gaussian does not match the previous global Gaussian, repeating the steps of generating, truncating, selecting, aggregating and comparing, and
        in response to the comparison indicating that the new global Gaussian matches the previous global Gaussian, determining that the method has converged, and using the matching Gaussians to compute a Gaussian probability density for the set of data.

11. The system of claim 10, further including a wireless hand-held device that includes a transceiver for sending and receiving wireless data, the data storage circuit, the software-programmed computer circuit, to process the received wireless data as the set of data to compute Gaussian probability density data for the wireless data and, therefrom, mitigate noise therein.

12. The system of claim 10, further including a networking device that includes a communications circuit for sending and receiving data, the data storage circuit, the software-programmed computer circuit, to process the received data as the set of data to compute Gaussian probability density data for the received data and, therefrom, mitigate noise therein.

13. The system of claim 10, further including a local area network device for wirelessly communicating packet-based data with other network devices in a local environment, the device including a communications circuit for sending and receiving data with the other network devices, the data storage circuit, the software-programmed computer circuit, to process data received from one of the other network devices as the set of data to compute Gaussian probability density data for the received data and, therefrom, mitigate noise therein.

14. The system of claim 10, wherein the software-programmed computer circuit is configured and arranged to select site-local univariate Gaussians by selecting a scaled univariate Gaussian having parameters that minimize Kullback-Leibler (KL) divergence.

15. The system of claim 10, wherein the software-programmed computer circuit is configured and arranged to determine that the current global Gaussian matches the previous global Gaussian in response to the current global Gaussian having the same moments as the moments of a truncated multivariate normal distribution.

16. The system of claim 10, wherein the software-programmed computer circuit is configured and arranged to determine that the current global Gaussian matches the previous global Gaussian in response to the current global Gaussian having the same mass as the mass of a truncated multivariate normal distribution.

17. The system of claim 10, wherein the software-programmed computer circuit is configured and arranged to determine that the current global Gaussian matches the previous global Gaussian in response to the current global Gaussian having the same mass as the mass of a truncated multivariate normal distribution and, in response thereto, output a value that is the density of the set of data.

18. The system of claim 10, wherein the software-programmed computer circuit is configured and arranged to truncate the cavity-local univariate Gaussians to form cavity-local univariate truncated Gaussians by selecting density regions in the set of data to correspond to a characteristic of the data to be analyzed, and forming cavity-local univariate truncated Gaussians that define the selected density regions in the set of data.

19. The system of claim 10, wherein the software-programmed computer circuit is configured and arranged to truncate the cavity-local univariate Gaussians to form cavity-local univariate truncated Gaussians by selecting density regions in the set of data to correspond to a classification error that is desirably reduced, and forming cavity-local univariate truncated Gaussians that define the selected density regions in the set of data.

20. An apparatus for computing probability densities of a set of data representing multivariate Gaussians, the apparatus comprising:

means for generating cavity-local univariate truncated Gaussians by truncating cavity-local univariate Gaussians for the set of data;

means for selecting site-local univariate Gaussians based on a determination that the moments of the products of the cavity-local univariate Gaussians and the selected site-local univariate Gaussians match the moments of the cavity-local univariate truncated Gaussians; and means, in response to a current global Gaussian based on the site-local univariate Gaussians matching a previous global Gaussian, for generating Gaussian probability density data corresponding to the set of data.

* * * * *